United States Patent [19]

Falk

[11] Patent Number: 4,688,639

[45] Date of Patent: Aug. 25, 1987

[54] POLYMER GELATION PROCESS FOR OIL RECOVERY APPLICATIONS

[75] Inventor: David O. Falk, Denver, Colo.

[73] Assignee: Marathon Oil Company, Findlay, Ohio

[21] Appl. No.: 946,746

[22] Filed: Dec. 24, 1986

[51] Int. Cl.$^4$ .................. E21B 43/26; E21B 33/13
[52] U.S. Cl. ............................ 166/295; 166/308; 166/293
[58] Field of Search ............ 166/285, 293, 299, 295, 166/305.1, 308; 252/0.551

[56] References Cited

U.S. PATENT DOCUMENTS

| Re. 32,114 | 4/1986 | Argabright et al. | 166/252 |
|---|---|---|---|
| 3,762,476 | 10/1973 | Gall | 166/294 |
| 3,981,363 | 9/1976 | Gall | 166/270 |
| 4,018,286 | 4/1977 | Gall et al. | 166/295 |
| 4,039,029 | 8/1977 | Gall | 166/294 |
| 4,137,182 | 1/1979 | Golonkin | 166/283 X |
| 4,193,453 | 3/1980 | Golonkin | 166/295 |

OTHER PUBLICATIONS

Shuttleworth and Russel, *Journal of The Society of Leather Trades' Chemists*, "The Kinetics of Chrome Tannage Part I.," U.K., 1965, v. 49, pp. 133-154; Part III., U.K., 1965, v. 49, pp. 251-260; Part IV., U.K., 1965, v. 49, pp. 261-268.

Von Erdman, *Das Leder*, "Condensation of Mononuclear Chromium (III) Salts to Polynuclear Compounds," Eduard Roether Verlag, Darmstadt, Germany, 1963, v. 14, p. 249.

Udy, Marvin J., *Chromium, vol. 1: Chemistry of Chromium and Its Compounds*, Reinhold Publ. Corp., N.Y., 1956, pp. 229-233.

Cotton and Wilkinson, *Advanced Inorganic Chemistry*, 3rd Ed., John Wiley & Sons, Inc., N.Y., 1972, pp. 836-839.

*Primary Examiner*—Stephen J. Novosad
*Assistant Examiner*—Thomas J. Odar
*Attorney, Agent, or Firm*—Jack L. Hummel; Rodney F. Brown

[57] ABSTRACT

A process employing a polymer gel in oil recovery applications. A gel is prepared by mixing a single aqueous gelation solution at the surface made up of a chromium acetate complex crosslinking agent and a mixture of an acrylamide polymer and guar gum polymer. The solution is injected into a desired treatment region and gelled to completion in situ.

14 Claims, No Drawings

POLYMER GELATION PROCESS FOR OIL RECOVERY APPLICATIONS

BACKGROUND OF THE INVENTION

1. Technical Field:

The invention relates to an oil recovery process and more particularly to a process of preparing a polymer gel for oil recovery applications.

2. Description of Related Art:

Polymer gels have potential application to a number of oil recovery processes including cementing, fracturing and conformance improvement. Poor vertical conformance results from the vertical juxtaposition of relatively high permeability geologic regions to relatively low permeability regions within a subterranean formation. Poor areal conformance results from the presence of high permeability streaks and high permeability anomalies within the formation matrix, such as vertical fractures and networks of the same, which have very high permeability relative to the formation matrix. Fluids generally exhibit poor flow profiles and sweep efficiencies in subterranean formations having poor vertical or areal conformance. Poor conformance is particularly a problem where vertical heterogeneity and/or fracture networks or other structural anomalies are in fluid communication with a subterranean wellbore across which fluids are injected or produced.

A number of attempts to remedy conformance problems exist. U.S. Pat. Nos. 3,762,476; 3,981,363; 4,018,286; and 4,039,029 to Gall or Gall et al describe various processes wherein gel compositions are formed in high permeability regions of subterranean formations to reduce the permeability therein. According to U.S. Pat. No. 3,762,476, a polymer such as polyacrylamide is injected into a formation followed sequentially by a crosslinking agent. The sequentially injected slugs are believed to permeate the treatment region of the formation and gel in situ.

It is generally held that effective polymer/crosslinking agent systems necessitate sequential injection of the gel components followed by in situ mixing because gel systems mixed on the surface are difficult to regulate. Systems mixed on the surface often gel at an excessive rate, forming gel balls before they can effectively penetrate the treatment region. However, in practice, conformance treatments such as that disclosed in U.S. Pat. No. 3,762,476 using sequentially injected gel systems have also proven unsatisfactory because of the inability to achieve complete mixing and gelation in the formation. As a result, gels only form at the interface of the unmixed gel components and often in regions remote from the desired treatment region. Likewise, processes employing sequentially injected gel systems for cementing and fracturing applications have proven unsatisfactory because the resulting gels do not have sufficient strength and integrity to withstand the stresses encountered in oil recovery processes. Even when such processes are operable, the polymers commonly used with them are relatively expensive, which can render the treatments impractical from an economic standpoint.

A need exists for a gelation process which can produce a range of versatile gels having the desired predetermined strengths and integrities for conformance-improving, cementing, or fracturing applications. A need exists for a gelation process which can accomplish these objectives in a cost-effective manner.

SUMMARY OF THE INVENTION

The present invention provides a process for improving hydrocarbon recovery from a subterranean hydrocarbon-bearing formation penetrated by a production and/or injection well. According to one embodiment, the process improves vertical and areal conformance in the formation and correspondingly improves flow profiles and sweep efficiencies of injected jected and/or produced fluids in the formation. According to another embodiment, the process provides a strong, permanent material for cementing jobs. According to yet another embodiment, the process provides an effective fluid for formation fracturing. These objectives and others are achieved by means of a polymer gel.

The gel comprises a chromic carboxylate crosslinking agent and a mixture of synthetic acrylamide polymer and a guar gum polymer. The gel is prepared by forming a gelation solution above ground containing the polymer mixture and crosslinking agent and injecting the solution into the desired treatment region via a wellbore in fluid communication therewith. The gelation solution is advantageously at least partially gelled by the time it reaches the treatment region to inhibit or prevent its propagation into adjoining regions where no treatment is desired.

The resultant gel is a viscous continuous single-phase composition comprised of the polymers and crosslinking agent. Once the gel is in place for its desired function or backflushed in the case of formation fracturing, fluids may be injected into or produced from the hydrocarbon-bearing regions of the formation in fluid communication with the wellbore. The gel in place is substantially incapable of flowing from the treatment region and is substantially permanent and resistant to in situ degradation.

The process provides distinct advantages over known gelation processes. The practitioner of the present invention can fully prepare and mix a single gelation solution at the surface. The practitioner substitutes a relatively inexpensive guar gum polymer for a portion of the synthetic acrylamide polymer in the gelation solution to reduce the cost of the treatment without significantly diminishing the strength and stability of the resultant gel. The gel meets the demands of the formation and the specific hydrocarbon recovery process employed.

DESCRIPTION OF PREFERRED EMBODIMENTS

The present invention is described in the context of specific terms which are defined as follows. The formation consists of two general regions, the "matrix" and "anomalies." An "anomaly" is a volume or void space in the formation having very high permeability relative to the matrix. It is inclusive of terms such as streaks, fractures, fracture networks, vugs, solution channels, caverns, washouts, cavities, etc. The "matrix" is substantially the remainder of the formation volume characterized as essentially homogeneous, continuous, sedimentary reservoir material free of anomalies and often competent.

The matrix consists of horizontal "zones" of distinctive subternean material of continuous geologic properties which extend in the horizontal direction. "Vertical conformance" is a measure of the degree of geologic unformity in permeability as one moves vertically across the formation. "Areal conformance" is a measure of the degree of geologic uniformity in permeability as one moves horizontally across the formation. A "flow profile" qualitatively describes the uniformity of fluid flow through a subterranean formation while "sweep efficiency" is the quantitative analog of "flow profile." "Plugging" is a substantial reduction in permeability in a region of a formation.

The term "gel" as used herein is directed to a continuous three-dimensional crosslinked polymeric network having an ultra high molecular weight. The gel contains a liquid medium such as water which is confined within the solid polymeric network. The fusion of a liquid and a solid component into a single-phase system provides the gel with a unique phase behavior. Gels employed by the present invention have sufficient structure so as not to propagate from the confines of a plugged region into a less permeable region of the formation adjoining the plugged region once in place.

The gel is qualitatively defined as "flowing" or "non-flowing" based on its ability to flow under the force of gravity when unconfined on the surface at ambient atmospheric conditions. A flowing gel flows under these conditions; a non-flowing gel does not. Nonetheless, both a non-flowing gel and a flowing gel are defined herein as having sufficient structure so as not to propagate from the confines of the desired treatment region when injected therein.

"Partially gelled" solutions are also referred to herein. A partially gelled solution is at least somewhat more viscous than an uncrosslinked polymer solution such that it is incapable of entering a less permeable region where no treatment is desired, but sufficiently fluid such that it is capable of displacement into a desired treatment zone. The crosslinking agent of the partially gelled solution has reacted incompletely with the polymer with the result that neither all of the polymer nor all of the crosslinking agent in the gelation solution is totally consumed by the cosslinking reaction. The partially gelled solution is capable of further crosslinking to completion resulting in the desired gel without the addition of more crosslinking agent.

"Crosslinked to completion" means that the gel composition is incapable of further crosslinking because one or both of the required reactants in the initial solution are consumed. Further crosslinking is only possible if either polymer, crosslinking agent, or both are added to the gel composition.

The gel composition utilized in the present invention is comprised of a synthetic acrylamide polymer, a guar gum polymer, and a crosslinking agent capable of crosslinking the two polymers. The acrylamide polymer is defined as any crosslinkable, high molecular weight, water-soluble, synthetic polymer, copolymer, or mixture thereof, containing one or more acrylamide species. The average molecular weight of the acrylamide polymer is in the range of about 10,000 to about 50,000,000 and preferably about 100,000 to about 20,000,000, and most preferably about 200,000 to about 15,000,000.

Useful acrylamide polymers include inter alia polyacrylamide, partially hydrolyzed polyacrylamide, copolymers containing acrylamide, and terpolymers containing acrylamide. As defined herein, polyacrylamide (PA) is an acrylamide polymer having substantially less than 1% of the acrylamide groups in the form of carboxylate groups. Partially hydrolyzed polyacrylamide (PHPA) is an acrylamide polymer having at least 1%, but not 100%, of the acrylamide groups in the form of carboxylate groups. The acrylamide polymer may be prepared according to any conventional method known in the art, but preferably has the specific properties of acrylamide polymer prepared according to the method disclosed by U.S. Pat. No. Re. 32,114 to Argabright et al incorporated herein by reference.

The guar gum is a conventional natural biopolymer. It has an average molecular weight of about 5,000 to about 1,000,000 and preferably about 250,000 to about 750,000.

The crosslinking agent is a chromic carboxylate complex. The term "complex" is defined herein as an ion or molecule containing two or more interassociated ionic, radical or molecular species. A complex ion as a whole has a distinct electrical charge while a complex molecule is electrically neutral. The term "chromic carboxylate complex" encompasses a single complex, mixtures of complexes containing the same carboxylate species, and mixtures of complexes containing differing carboxylate species.

The complex of the present invention includes at least one or more electropositive chromium III species and one or more electronegative carboxylate species. The complex may advantageously also contain one or more electronegative hydroxide and/or oxygen species. It is beleived that, when two or more chromium III species are present in the complex, the oxygen or hydroxide species may help to bridge the chromium III species. Each complex optionally contains additional species which are not essential to the polymer crosslinking function of the complex. For example, inorganic mono- and/or divalent ions, which function merely to balance the electrical charge of the complex, or one or more water molecules may be associated with each complex. Representative formulae of such complexes include:

$[Cr_3(CH_3CO_2)_6(OH)_2]^{+1}$;
$[Cr_3(OH)_2(CH_3CO_2)_6]NO_3 \cdot 6H_2O$;
$[Cr_3(H_2O)_2(CH_3CO_2)_6]^{+3}$;
$[Cr_3(H_2O)_2(CH_3CO_2)_6](CH_3CO_2)_3 \cdot H_2O$; etc.

Trivalent chromium and chromic ion are equivalent terms encompassed by the term chromium III species as used herein. The carboxylate species are advantageously derived from water-soluble salts of carboxylic acids, especially low molecular weight mono-basic acids. Carboxylate species derived from salts of formic, acetic, propionic, and lactic acid, lower substituted derivatives thereof and mixtures thereof are especially preferred. The carbodylate spcies include the following water-soluble species: formate, acetate, propionate, lactate, lower substituted drivatives therof, and mixtures thereof. The optional inorganic ions include sodium, sulfate, nitrate and chloride ions.

A host of complexes of the type described above and their method of preparation are well known in the leather tanning art. These complexes are described in Shuttleworth and Russel, *Journal of The Society of Leather Trades' Chemists*, "The Kinetics of Chrome Tannage Part I.," United Kingdom, 1965, v. 49, p. 133-154; "Part III.," United Kingdom, 1965, v. 49, p. 251-260; "Part IV.," United Kingdom, 1965, v. 49, p. 261-268; and Von Erdman, *Das Leder*, "Condensation of Mononuclear Chromium (III) Salts to Polynuclear Compounds," Eduard Roether Verlag, Darmstadt, Germany, 1963, v. 14, p. 249; and are incorporated herein by reference. Udy, Marvin J., *Chromium, Volume 1: Chemistry of Chromium and its Compounds*, Reinhold Publishing Corp., N.Y., 1956, pp. 229-233; and Cotton and Wilkinson, *Advanced Inorganic Chemis-*

*try 3rd Ed.*, John Wiley & Sons, Inc., N.Y., 1972, pp. 836–839, further describe typical complexes which may be within the scope of the present invention and are incorporated herein by reference. The present invention is not limited to the specific complexes and mixtures thereof described in the references, but may include others satisfying the above-stated definition.

The gel is formed by admixing the polymers and the crosslinking agent at the surface to form an injectable gelation solution. Surface admixing broadly encompasses inter alia mixing the solution in bulk at the surface prior to injection or simultaneously mixing the solution at or near the wellhead by in-line mixing means while injecting it. Admixing is accomplished for example by dissolving the starting materials for the crosslinking agent in an appropriate aqueous solvent. Exemplary starting materials include solid $CrAc_3 \cdot H_2O$, solid $Cr_3Ac_7(OH)_2$ or a solution labeled "Chromic Acetate 50% Solution" commercially available, for example, from McGean Chemical Co., Inc., 1250 Terminal Tower, Cleveland, Ohio 44113, U.S.A. The crosslinking agent solution is then mixed with an aqueous polymer mixture to produce the gelation solution. Among other alternatives, the starting materials for the crosslinking agent can be dissolved directly in the aqueous polymer mixture to form the gelation solution in a single step.

The aqueous solvent of the gelation solution may be fresh water or a brine having a total dissolved solids concentration up to the solubility limit of the solids in water. Inert fillers such as crushed or naturally fine rock material or glass beads can also be added to the gelation solution to reinforce the gel network structure.

The present process enables the practitioner to customize or tailor-make a gel having a predetermined gelation rate and predetermined gel properties of strength and stability from the above-described composition. The gelation rate is defined as the degree of gel formation as a function of time or, synonymously, the rate of crosslinking in the gelation solution. The degree of crosslinking may be quantified in terms of gel viscosity and/or strength. Gel strength of a non-flowing gel is defined as the coherence of the gel network or resistance to deformation under external forces. Gel strength of a flowing gel is defined as the resistance of the gel to filtration or flow. Stability is defined as either thermal or phase stability. Thermal stability is the ability of a gel to withstand temperature extremes without degradation. Phase stability is the ability of a gel to resist syneresis which can detract from the gel structure and performance.

Tailor-making or customizing a gel in the manner of the present invention to meet the demands of a particular treatment region is provided in part by correlating the independent gelation parameters with the dependent variables of gelation rate and resultant gel strength and stability. The independent gelation parameters are the surface and in situ gelation conditions including: temperature, pH, ionic strength and specific electrolytic makeup of the solvent, total polymer concentration, weight ratio of the polymeric species in the polymer mixture, weight ratio of polymer to crosslinking agent, degree of polymer hydrolysis, and average molecular weight of the polymers.

The operable ranges of the gelation parameters are correlated with the dependent variables of gelation rate and resultant gel properties by means including qualitative bottle testing, quantitative viscosimetric analysis, packed-column flooding, and core flooding. The operable ranges of a number of gelation parameters and their correlation with the dependent variables are described below.

The lower temperature limit of the gelation solution at the surface is the freezing point of the solution and the upper limit is essentially the thermal stability limit of the polymers. The solution is generally maintained at ambient temperature or higher at the surface. The temperature may be adjusted by heating or cooling the aqueous solvent. Increasing the temperature within the prescribed range increases the gelation rate.

The initial pH of the gelation solution is within a range of about 3 to 13 and preferably about 6 to 13. Although gelation can occur at an acidic pH, lowering the initial pH of the solution below 7 does not favor gelation. The initial pH of the solution is most preferably alka line, i.e., greater than 7 to about 13. Increasing the pH within the prescribed range increases the rate of gelation.

The total polymer concentration in the gelation solution is about 500 ppm up to the solubility limit of the polymer in the solvent or the rheological constraints of the polymer mixture, preferably about 1000 to about 200,000 ppm, and most preferably about 3000 to about 100,000. Increasing the total polymer concentration increases the gelation rate and ultimate gel strength at a constant ratio of polymer to crosslinking agent.

The weight ration of acrylamide polymer to guar gum polymer in the gelation solution is in the range of about 100:1 to 1:100, preferably in the range of about 3:1 to 1:3, and most preferably about 1:1.

The ionic strength of the solvent can be from that of deionized distilled water to that of a brine having an ion concentration approaching the solubility limit of the brine. Increasing the ionic strength of the solution can increase the gelation rate.

The weight ratio of polymers to chromium III and carboxylate species comprising the complex is about 1:1 to about 500:1, preferably about 2.5:1 to about 100:1, and most preferably about 5:1 to about 40:1. Decreasing the ratio generally increases the gelation rate and up to a certain point generally increases the gel strength, especially at a constant high polymer concentration.

The acrylamide polymer employed has about 0 to 60% and preferably about 0 to 30% of its amide groups hydrolyzed to carboxylate groups. Within the preferred range, increasing the degree of hydrolysis increases the gelation rate. Increasing the molecular weight of the polymer increases the gel strength.

It is apparent from these correlations that one can produce gels across a very broad range of gelation rates and gel properties as a function of the gelation conditions. Thus, to effect an optimum gelation treatment according to the present process, the practitioner predetermines the gelation rate and properties of the resultant gel which meet the treatment demands of the given region and thereafter produces the gel having these predetermined characteristics. The treatment demands include the in situ gelation conditions such as temperature, connate water properties, and permeability of the region as well as the post treatment conditions such as injection and production pressures. Analytical methods known to one skilled in the art are used to determine the treatment demands. The treatment demands provide criteria to predetermine the gelation rate and resultant gel properties in the manner described above and continuing hereafter.

The practitioner advantageously selects a predetermined gelation rate which enables preparation of the gelation solution at the surface, injection of the solution as a single uniform slug into the wellbore, and displacement of the entire solution into the desired subterranean zone. Once in place in the desired treatment region, gelation of the solution advantageously proceeds to achieve substantially complete gelation of the solution in situ.

The present gelation mechanism enables the practitioner to design a gelation solution which can be injected into a treatment region at a desired injection rate with little resistance to injectivity. The solution is preferably gelled once it is in place in the desired subterranean region to minimize lost production from shut in of injection and/or product wells.

The gelation time of the gel ranges from near instantaneous for flowing gels up to 48 hours or longer for both flowing and non-flowing gels. Longer gelation times are limited by practical considerations of lost production when injection and production wells are shut in.

The present process is applicable to a number of hydrocarbon recovery applications. According to one embodiment, the process is applicable to conformance treatment of formations under most conditions and is specific to treating regions within the formation which are in fluid communication with an injection or production well. The flowing gel is especially applicable to the treatment of anomalies such as streaks of relatively high permeability, fractures or fracture networks in direct communication via the anomaly with an injection well but not also in direct communication via the anomaly with a production well. The ultimate gel is termed a flowing gel as defined herein because it would flow if unconfined on the surface. However, the flowing gel is sufficiently crosslinked to remain in place under injection conditions in the anomaly when confined thereby. Thus, the flowing gel is capable of effectively plugging the anomaly.

The flowing gel is not generally suitable for treatment of anomalies in direct communication via the anomaly with production wells because flowing gels do not have sufficient strength to withstand the drawdown pressure during production and may flow back into the wellbore. For treatment of anomalies in direct communication with production wells, non-flowing rigid gels having sufficient strength to withstand the production drawdown pressure are preferred. It is preferred that substantially none of the gel flows back into the wellbore when oil is produced after the conformance treatment.

In some specialized cases, the solution can be injected into a selected high permeability zone of the matrix and crosslinked to completion in situ as either a non-flowing gel or a flowing gel. Both flowing and non-flowing gels can be used for treatment of high permeability zones of the matrix because in general neither will flow from the treatment zone upon complete gelation, a necessary condition for the present invention. However, non-flowing gels are often preferred for treatment of high permeability zones in direct communication with production wells because of their increased strength.

Conformance treatment of regions in direct communication with a production well by the process of the present invention can effectively improve the hydrocarbon productivity of the well and/or decrease the water to hydrocarbon ratio of the produced fluids.

According to other embodiments, the present process is applicable to cementing and fracturing operations. The gelation solution is prepared in the manner described above and applied according to conventional cementing or fracturing methods known in the art. The nonflowing rigid gel produced according to the present invention is the preferred cement composition for cementing jobs. The composition is particularly applicable to remedial squeeze-cementing jobs which can also effectively improve the hydrocarbon productivity of a production well and/or decrease the water to hydrocarbon ratio of the produced fluids. The cement composition is also applicable to plugging abondoned wells. The flowing gel produced according to the present invention is the preferred fracturing fluid.

The gels are produced in a manner which renders them insensitive to most extreme formation conditions. The gels can be applied to the treatment of many different geological structures including high permeability zones within the formation matrix and anomalies external to the matrix such as fractures and other cavities. The gels can be stable at formation temperatures as high as 130° C. and at any formation pH contemplated. The gels are relatively insensitive to the stratigraphy of the rock and can be employed in carbonate and sandstone strata and unconsolidated or consolidated strata having varying mineralogy. Once the gels are in place, it is extremely difficult to displace the gels by physical or chemical means other than total destruction of the crosslinked network. The gels may be reversible on contact with hydrogen peroxide or sodium hypochlorite, but are substantially insoluble in the formation fluids.

The following examples demonstrate the practice and utility of the present invention but are not to be construed as limiting the scope thereof.

EXAMPLES

All of the gelation solutions in the following examples are prepared by combining the gel components in Denver, Col. U.S.A. tap water. The polymers employed in the gelation solutions of the present invention are a 30% hydrolyzed polyacrylamide produced according to the process of U.S. Pat. No. Re. 32,114, which has a molecular weight of about 11,000,000, and a guar gum polymer, having a molecular weight of about 500,000. The control examples employ only one polymer in the gelation solution. In all cases, the total polymer concentration in the gelation solution is about 5000 ppm.

The crosslinking agent employed in the gelation solutions is obtained from a 50% aqueous chromium acetate solution. The weight ratio of polymer to crosslinking agent in the gelation solution is 20:1 and the concentration of chromic species in the gelation solution is about 44 ppm.

The gels are formed by placing 50 g of gelation solution in a widemouth bottle, capping the bottle, and curing the solution over time at 50° C. The bottles are periodically inverted to determine the qualitative gel strength.

Data, listing variable values relating to the formulation and maturation of each gel, are formatted in the following table. Each gel is represented in the table by a single horizontal entry. Data include the variable conditions for producing the gel and the qualitative strength of the gel over time.

The following gel strength code and nomenclature are useful for interpreting the table.

Gel Strength Code

A. No detectable gel formed: the bulk of the solution appears to have the same viscosity as the original polymer solution, although isolated local gel balls may be present.

B. Highly flowing gel: the gel appears to be only slightly more viscous than the initial polymer solution.

C. Flowing gel: most of the gel flows to the bottle cap by gravity upon inversion.

D. Moderately flowing gel: only a small portion ($\simeq$5–10%) of the gel does not readily flow to the bottle cap by gravity upon inversion (usually characterized as a tonguing gel).

E. Barely flowing gel: the gel can barely flow to the bottle cap and/or a significant portion (>15%) of the gel does not flow by gravity upon inversion.

F. Highly deformable nonflowing gel: the gel does not flow to the bottle cap by gravity upon inversion.

G. Moderately deformable nonflowing gel: the gel deforms about half way down the bottle by gravity upon inversion.

H. Slightly deformable nonflowing gel: only the gel surface slightly deforms by gravity upon inversion.

I. Rigid gel: there is no gel surface deformation by gravity upon inversion.

J. Ringing rigid gel: a tuning fork-like mechanical vibration can be felt upon tapping the bottle.

| | Nomenclature |
|---|---|
| Polymer Ratio: | weight ratio of acrylamide polymer to guar gum polymer |
| pH: | pH of the gelation solution |
| Time: | gelation time (hours) |
| Code: | gel strength code |

Table of Examples

| Example Number | Polymer Ratio | pH | Time/Code | | | | | | | | | | |
|---|---|---|---|---|---|---|---|---|---|---|---|---|---|
| | | | 0.5 | 1.0 | 2.5 | 4.0 | 6.0 | 22 | 48 | 72 | 168 | 288 | 432 |
| 1 | 1:0 | 10.2 | B | B | B | B | B | B | C | C | C | C | C |
| 2 | 3:1 | 10.0 | D | D | D | D | E | E | E | E | D | D | D |
| 3 | 1:1 | 9.8 | D | E | E | E | E | E | E | E | D | D | D |
| 4 | 1:3 | 9.5 | D | D | D | D | D | D | D | D | B | A | A |
| 5 | 0:1 | 8.3 | A | A | A | A | A | A | A | A | A | A | A |

The data of the Table show that gels can be produced according to the present invention from mixtures of an acrylamide polymer and guar gum polymer which are stronger than gels produced from either polymer alone under similar conditions. Although the strength and stability of some of the gels produced according to the present invention still appear limited, the gels can be strengthened and/or stabilized by modifying the reaction conditions in the manner shown herein.

While foregoing preferred embodiments of the invention have been described and shown, it is understood that all alternatives and modifications, such as those suggested and others, may be made thereto and fall within the scope of the invention.

I claim:

1. A process wherein a gelation solution forms a continuous crosslinked polymer gel utilized for a hydrocarbon recovey application in a treatment region of a hydrocarbon-bearing formation below an earthen surface penetrated by a wellbore in communication with said region, the process comprising the steps of:
   (a) preparing a gelation solution at the surface comprising a water-soluble synthetic acrylamide polymer, a guar gum polymer, a complex capable of crosslinking said polymers and formed of at least one electropositive chromium III species and at least one electronegative carboxylate species, and a solvent for said polymers and said complex;
   (b) injecting said gelation solution into said treatment region via said wellbore; and
   (c) forming said continuous crosslinked polymer gel in situ from said gelation solution to perform said hydrocarbon recovery application.

2. The process of claim 1 wherein said hydrocarbon recovery application is conformance improvement and comprises substantially plugging said treatment region.

3. The process of claim 2 wherein said treatment region is an anomaly in said hydrocarbon-bearing formation.

4. The process of claim 3 wherein said anomaly is a fracture or a fracture network.

5. The process of claim 2 wherein said treatment region is a matrix in said hydrocarbon-bearing formation.

6. The process of claim 1 wherein said hydrocarbon recovery application is wellbore cementing and said polymer gel is a cement.

7. The process of claim 1 wherein said acrylamide polymer is partially hydrolyzed polyacrylamide or polyacrylamide.

8. The process of claim 1 wherein the weight ratio of acrylamide polymer to guar gum polymer is about 3:1 to about 1:3.

9. The process of claim 8 wherein the weight ratio of acrylamide polymer to guar gum polymer is about 1:1.

10. The process of claim 1 wherein said gelation solution is partially gelled upon injection into said treatment region.

11. The process of claim 1 wherein said wellbore is a hydrocarbon production wellbore and said gel substantially reduces the water to hydrocarbon ratio of fluid produced from said wellbore.

12. The process of claim 1 wherein said wellbore is a hydrocarbon production wellbore and said gel substantially increases hydrocarbon productivity from said wellbore.

13. The process of claim 1 wherein said wellbore is an injection wellbore.

14. The process of claim 1 wherein said hydrocarbon recovery application is formation fracturing and said polymer gel is a fracturing fluid.

* * * * *

UNITED STATES PATENT AND TRADEMARK OFFICE
CERTIFICATE OF CORRECTION

PATENT NO. : 4,688,639

DATED : August 25, 1987

INVENTOR(S) : David O. Falk

It is certified that error appears in the above-identified patent and that said Letters Patent is hereby corrected as shown below:

| | |
|---|---|
| Col. 2, line 9: | After "injected" delete "jected". |
| Col. 2, line 64: | Delete "subternean" and insert --subterranean--. |
| Col. 2, line 67: | Delete "unformity" and insert --uniformity--. |
| Col. 4, line 26: | Delete "beleived" and insert --believed--. |
| Col. 4, line 48: | Delete "carbodylate" and insert --carboxylate--. |
| Col. 4, line 50: | Delete "drivatives therof," and insert --derivatives thereof,--. |
| Col. 5, line 18: | Delete "$Cr_3Ac_7(OH)_2or$" and insert --$Cr_3Ac_7(OH)_2$ or--. |
| Col. 6, line 18: | Delete "alka line" and insert --alkaline--. |
| Col. 6, line 29: | Delete "ration" and insert --ratio--. |

Signed and Sealed this

Second Day of February, 1988

Attest:

DONALD J. QUIGG

Attesting Officer    Commissioner of Patents and Trademarks